Sept. 27, 1927. 1,643,609
W. J. ROEPKE
AUTOMATIC PAN MAKING MACHINE
Filed July 5, 1922 11 Sheets-Sheet 1
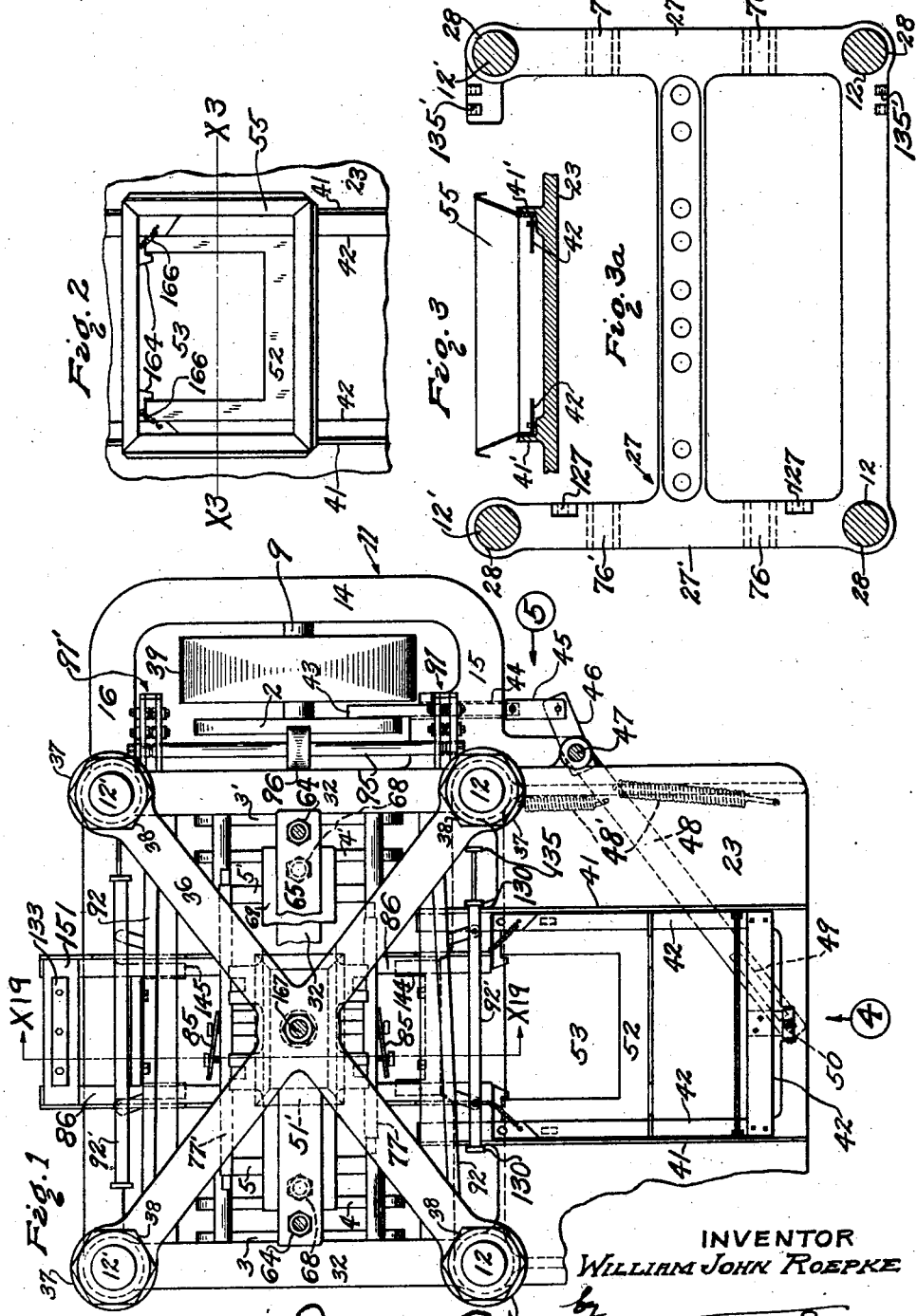
INVENTOR
WILLIAM JOHN ROEPKE
WITNESS:
J.A. McDowell
James R Townsend
his atty.

Sept. 27, 1927.  W. J. ROEPKE  1,643,609
AUTOMATIC PAN MAKING MACHINE
Filed July 5, 1922  11 Sheets-Sheet 2
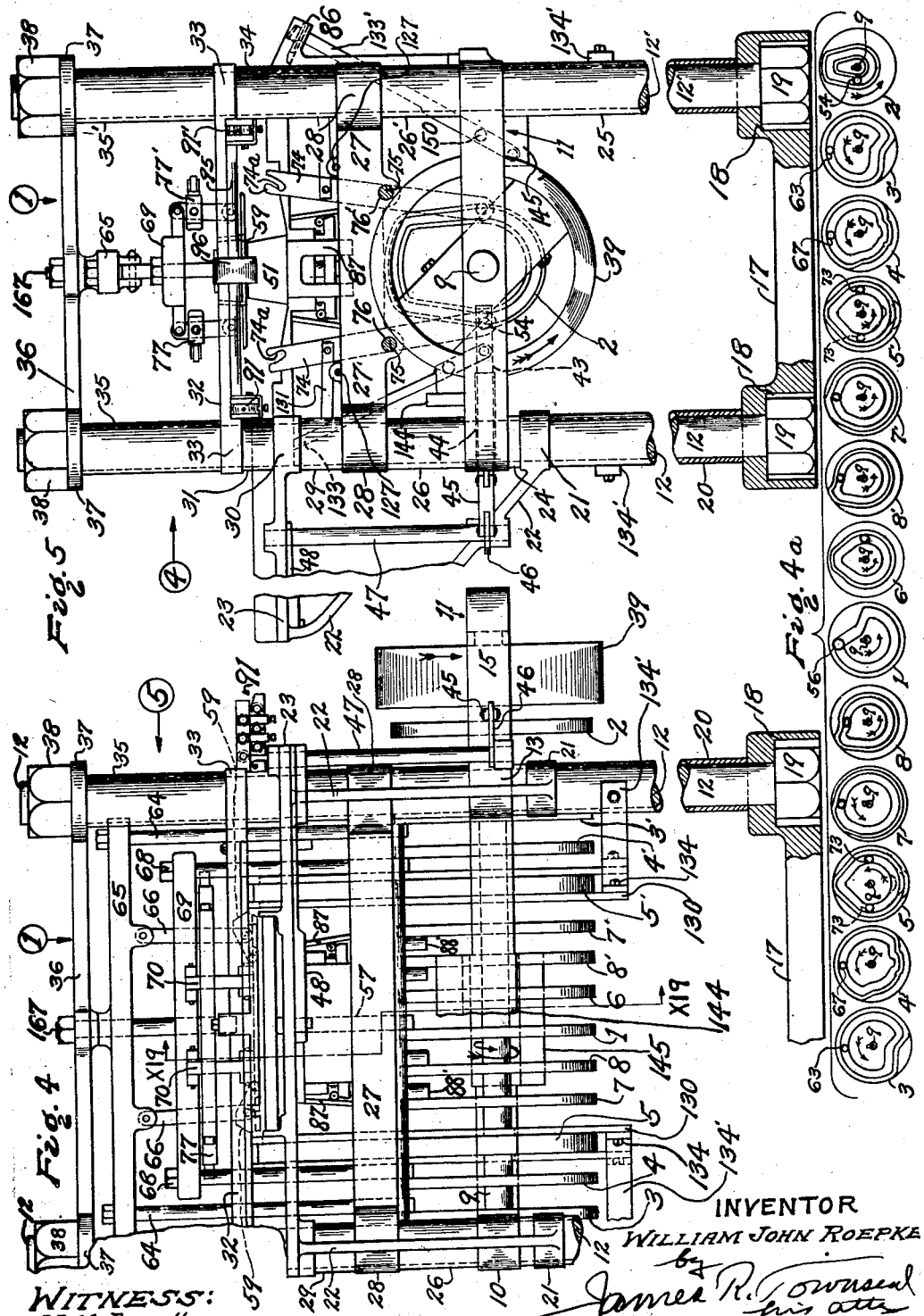
INVENTOR
WILLIAM JOHN ROEPKE
by
James R. Townsend
his atty
WITNESS:
J.A. McDowell

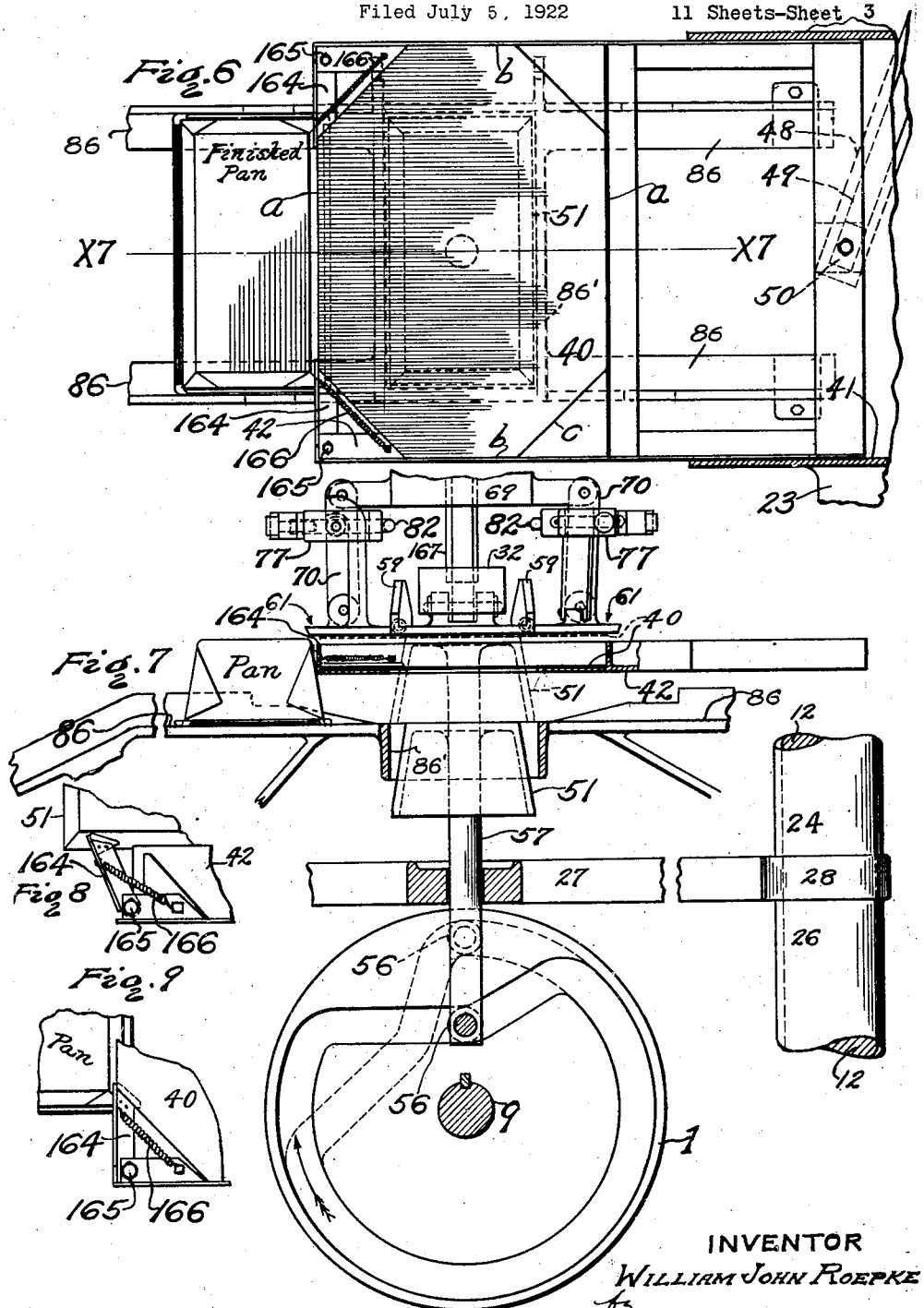

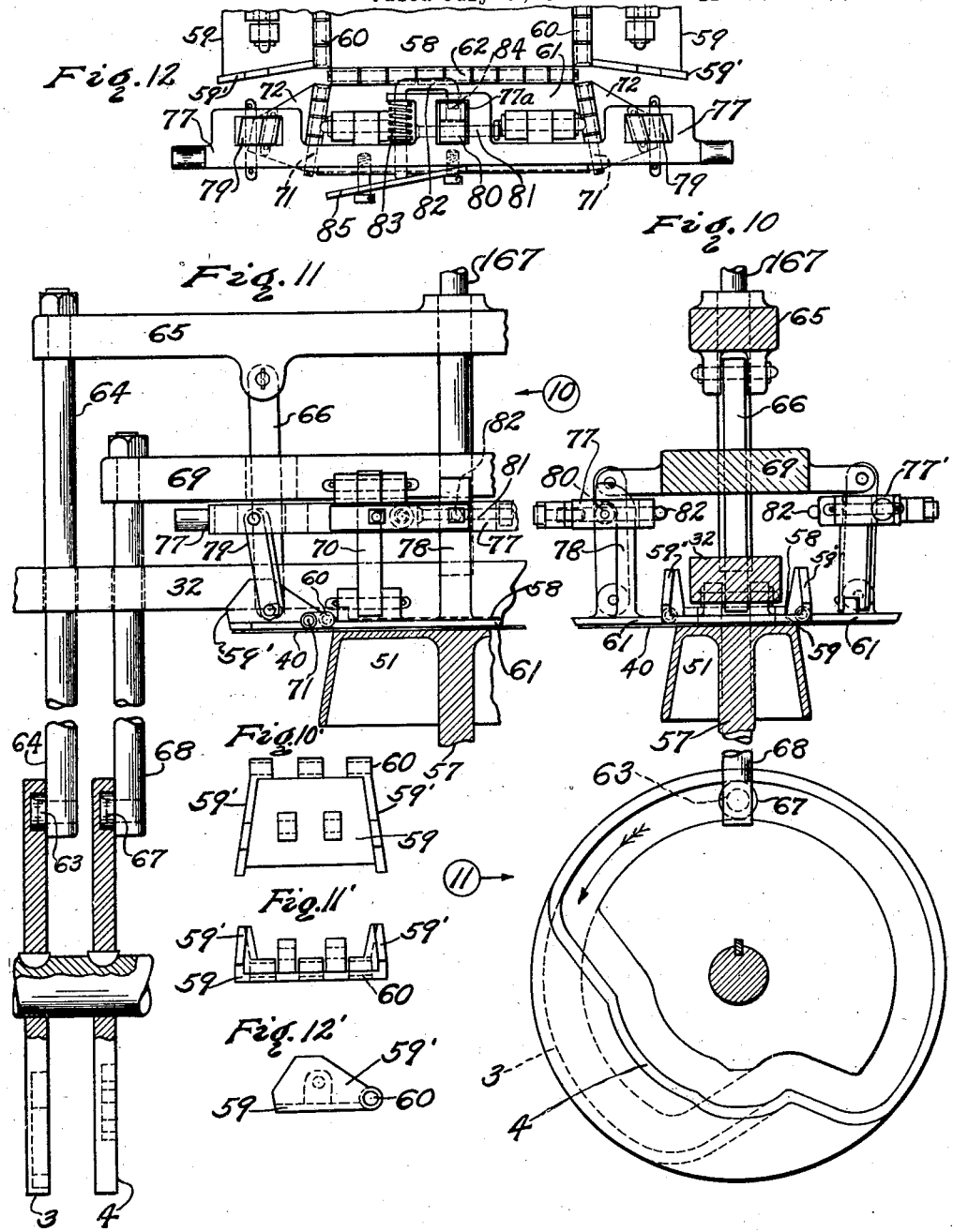

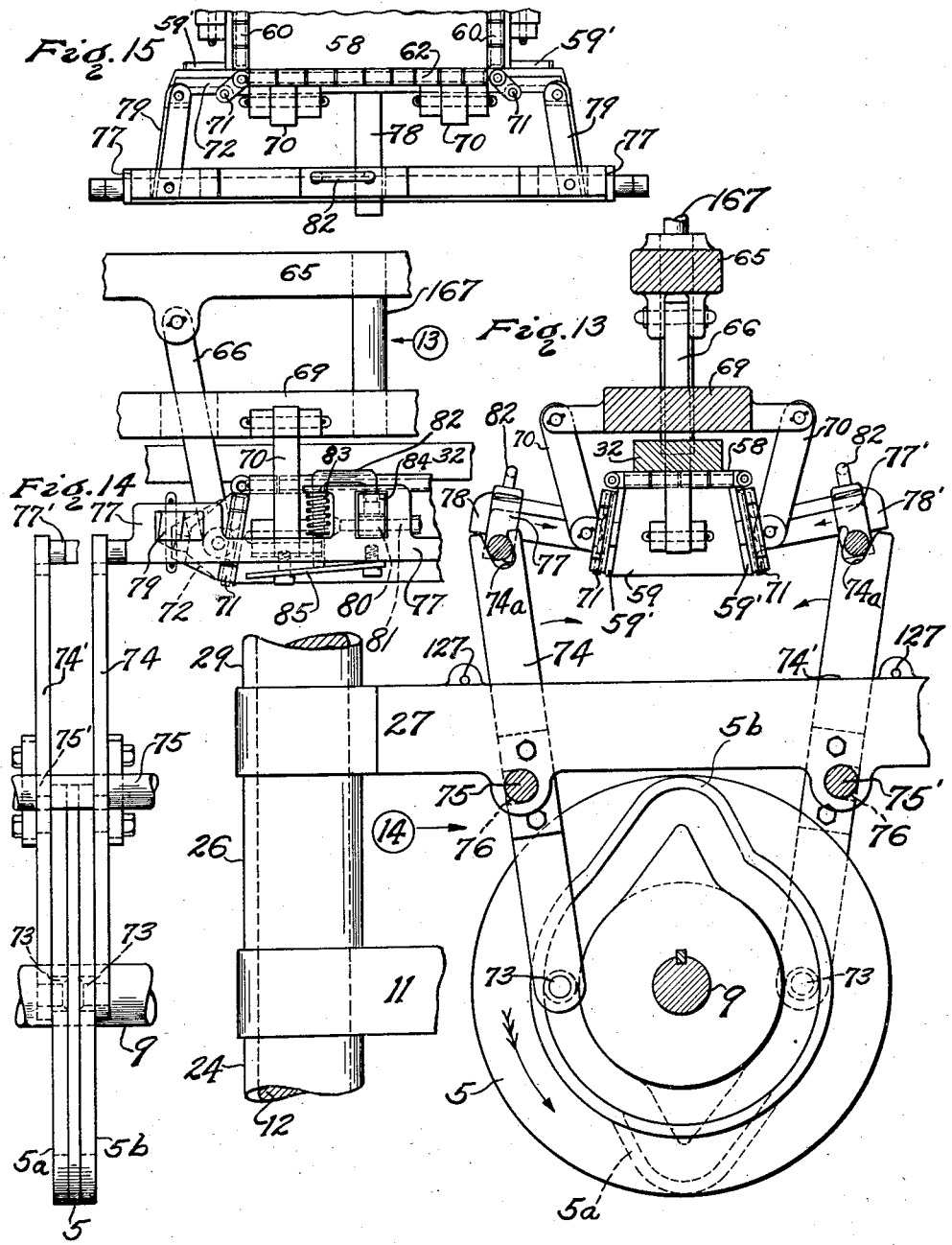

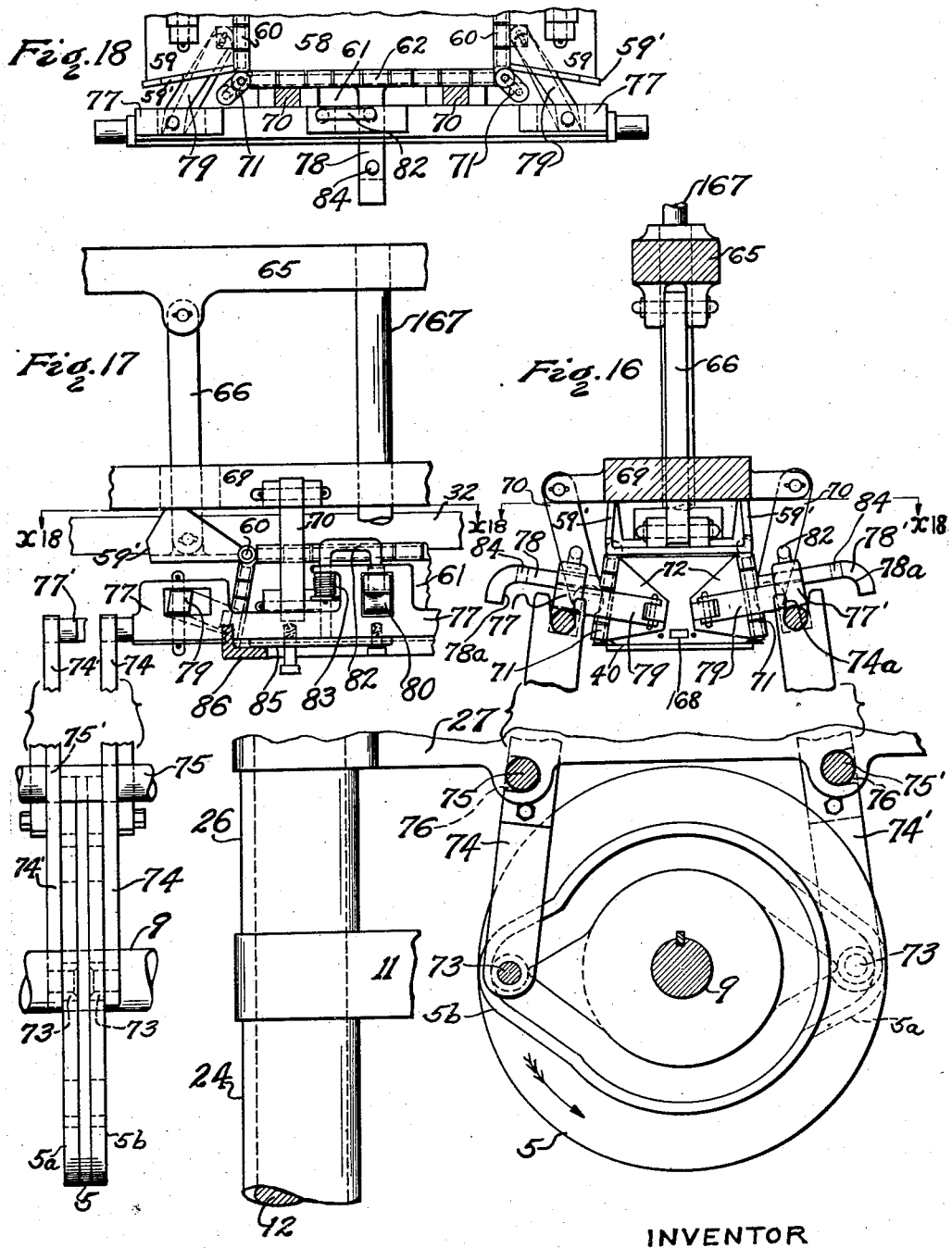

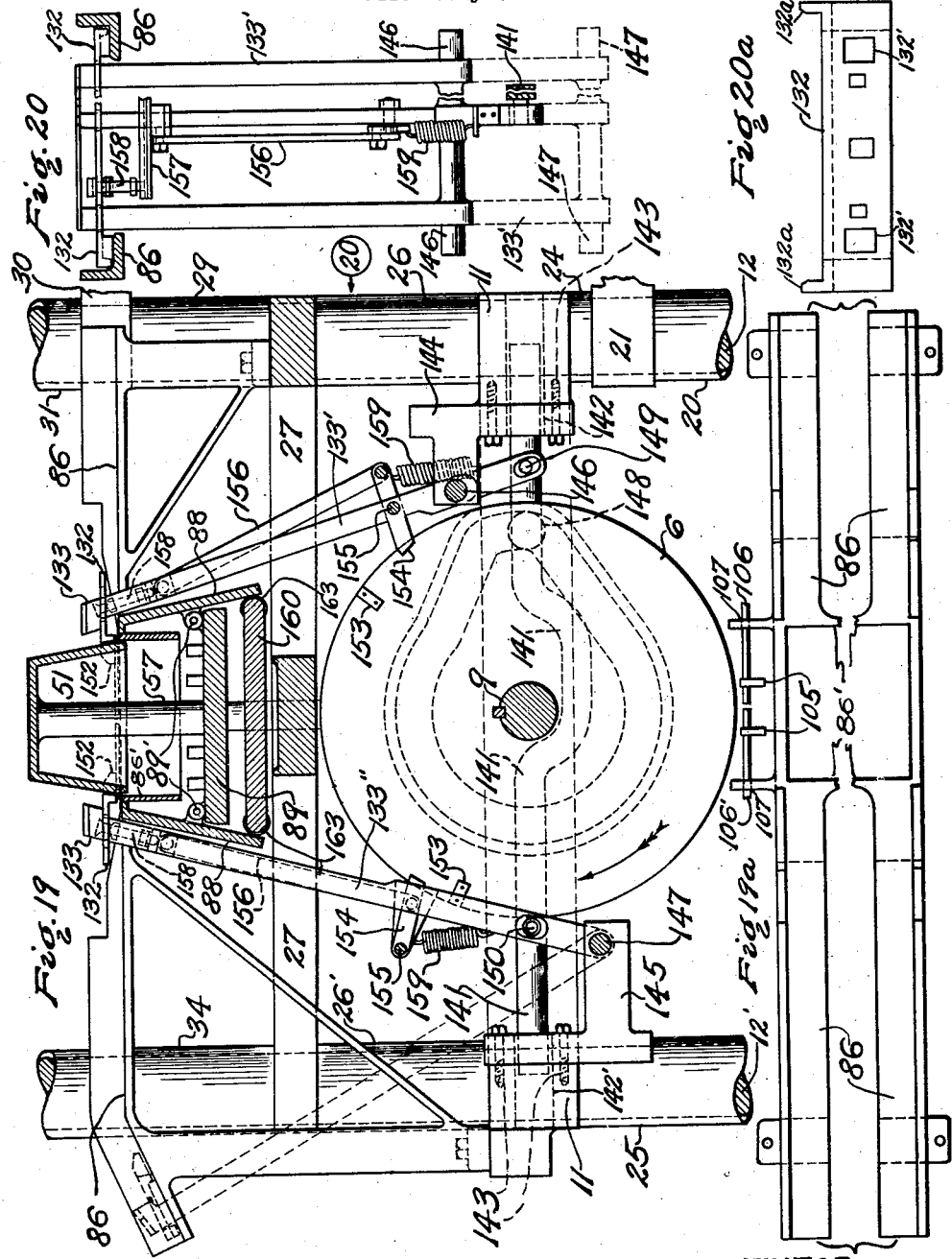

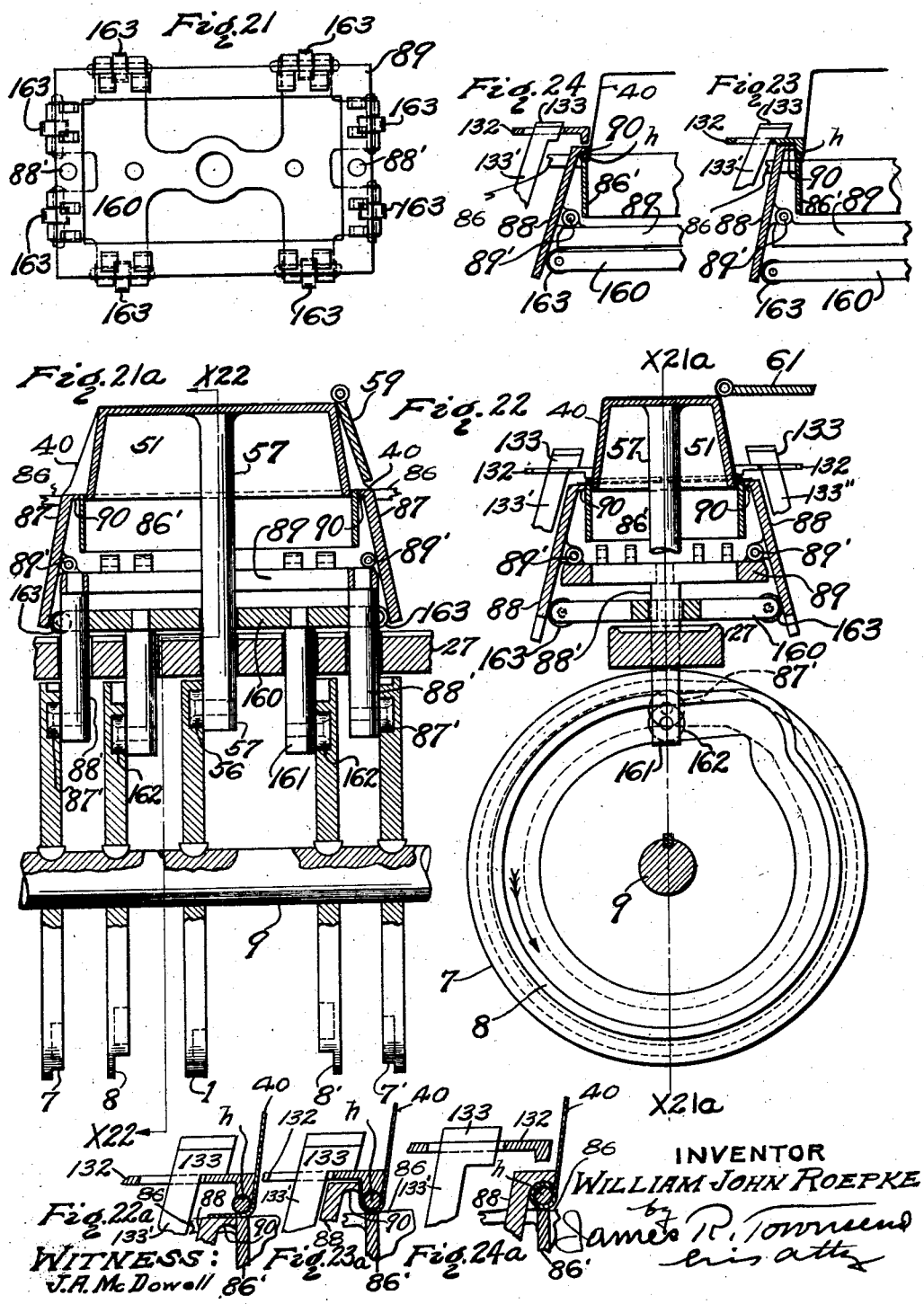

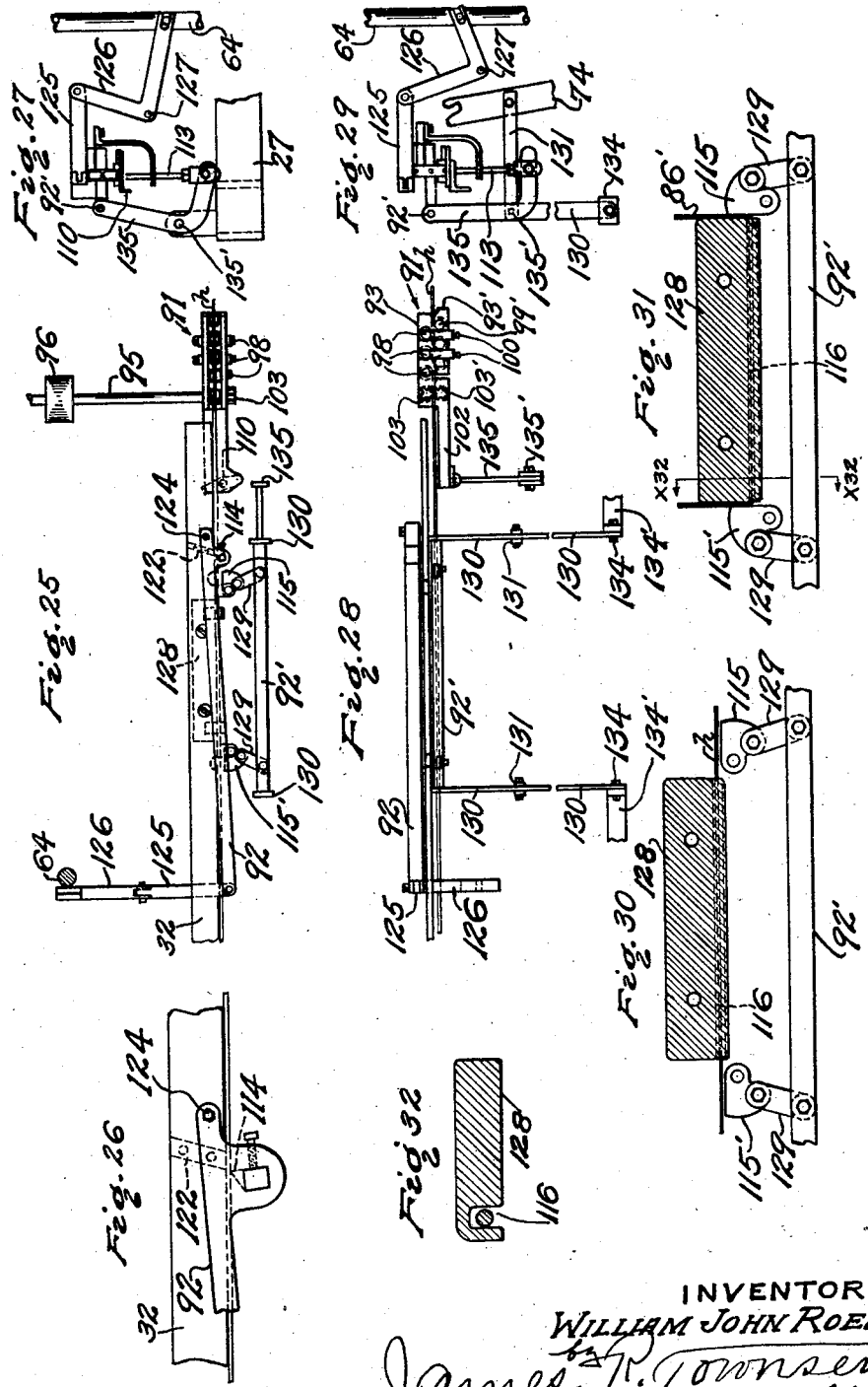

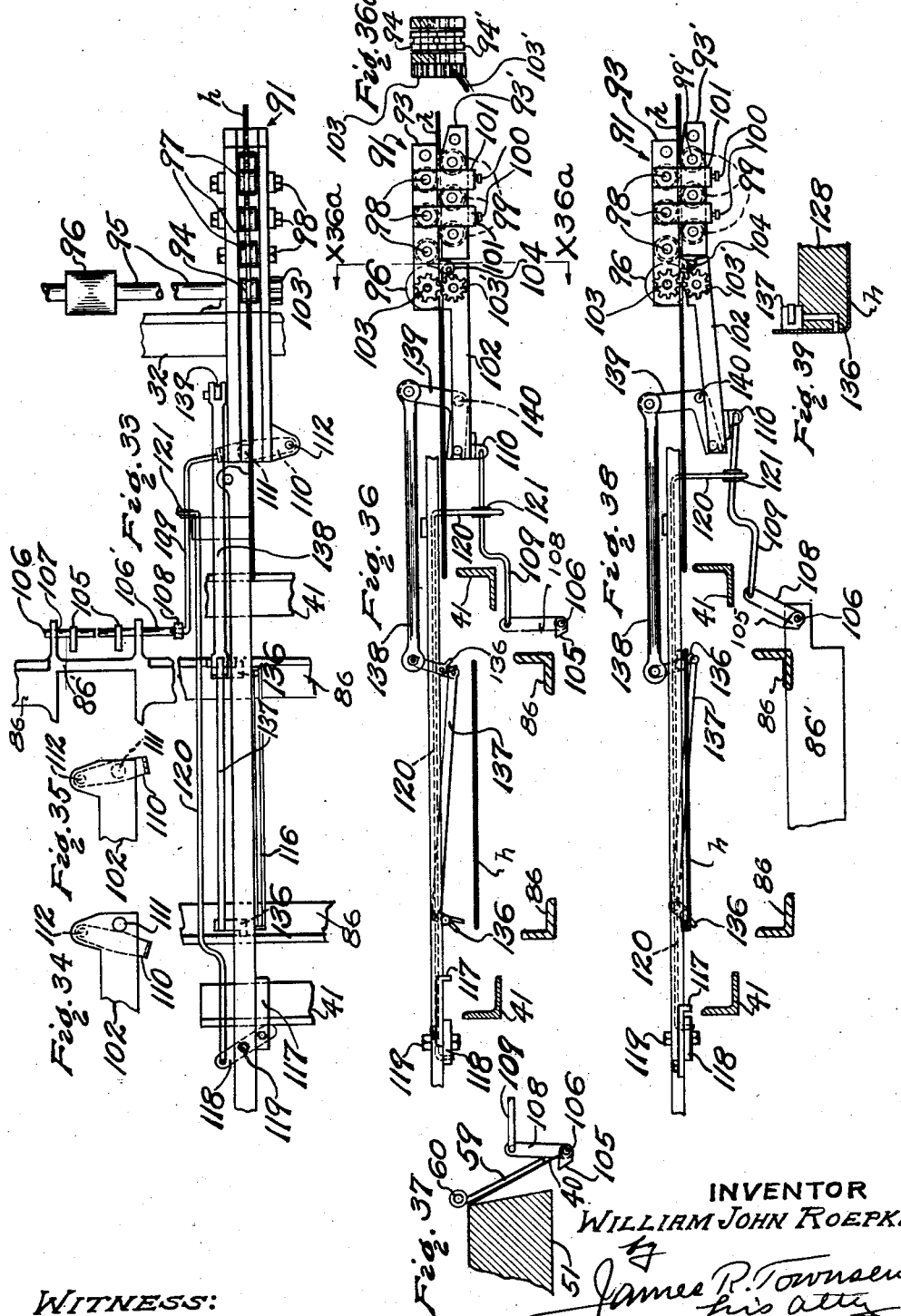

Sept. 27, 1927.  
W. J. ROEPKE  
1,643,609  
AUTOMATIC PAN MAKING MACHINE  
Filed July 5, 1922   11 Sheets-Sheet 11
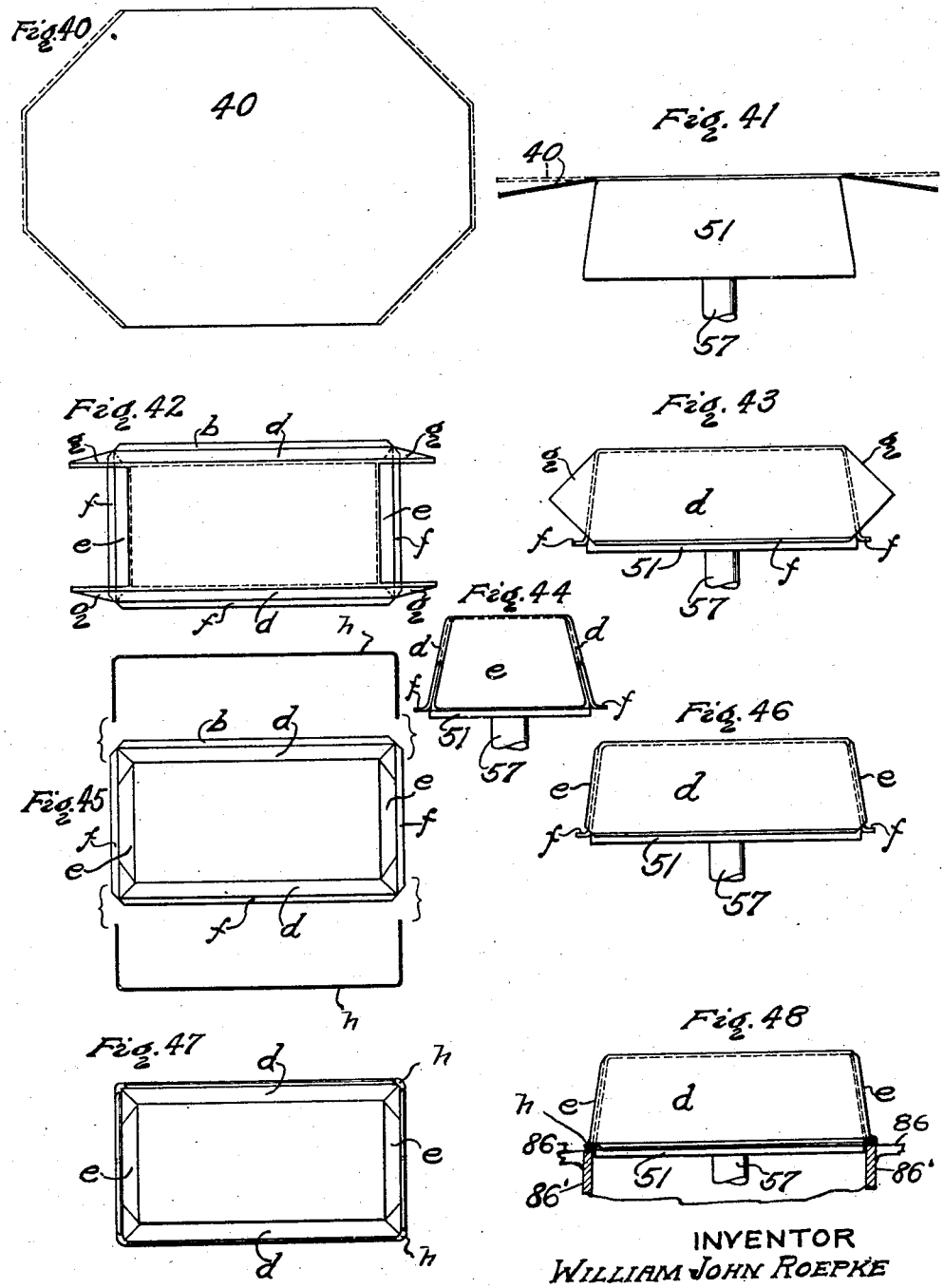
INVENTOR  
WILLIAM JOHN ROEPKE
WITNESS:  
J. A. McDowell Patented Sept. 27, 1927.

1,643,609

UNITED STATES PATENT OFFICE.

WILLIAM JOHN ROEPKE, OF LOS ANGELES, CALIFORNIA, ASSIGNOR, BY DIRECT AND MESNE ASSIGNMENTS, TO ROEPKE PAN MACHINE CORPORATION, OF WILMINGTON, DELAWARE, A CORPORATION OF DELAWARE.

AUTOMATIC PAN-MAKING MACHINE.

Application filed July 5, 1922. Serial No. 572,908.

An object of this invention is to provide practical automatic means for making a wire-reinforced pan from flat sheet metal and straight wire, which sheet metal is bent, folded and its edge crimped over the wire in the machine by a succession of operations.

This invention relates to the manufacture of bread pans, dripping pans and other pans formed of folded sheet metal, and an object of the invention is to increase the speed of producing deep pans and to avoid the stretching of the metal which occurs in the manufacture of pans by drawing and pressing processes.

An object is great rapidity in the production of pans of folded sheet material.

An object is to provide a machine by which the pans are made by progressive operations, all of which are automatic and in which there are no interruptions of the machine or of operations upon the material, from the time the sheet enters the machine until the finished pan is delivered. I have discovered that it is possible to fold a blank of sheet material into the form of a pan with corner folds folded onto the pan walls by providing a blank supporting form, and an abutment, a pair of side folding flaps, a pair of end folding flaps, with side walls and corner flaps cooperating therewith; and mechanism by which the form is made to clamp the blank against the abutment; and mechanism whereby the members of each pair of flaps are operated simultaneously with respect to each other and the pairs of flaps successively with respect to each other, to fold the projecting portions of the blank onto the form to form the sides and ends of the pan, the pairs of side and end folding flaps being operated successively at the latter portion of the folding operation; and the corner flaps being arranged to fold over upon the pan walls, the folds of material formed at the corners of the pan by the folding operation of said pairs of side and end folding flaps.

The invention is broadly new, basic and pioneer in that I have produced a combination whereby at the first revolution of the machine properly supplied with blanks and wire, the whole work of bending and folding a blank to pan form, cutting, bending and applying the wire to the pan rim, and finishing the pan is effected; and at the second, and every succeeding revolution, so long as the supply of wire and blanks is maintained, a pan is finished and ejected.

I have made it possible to produce sheet metal pans at a high speed by providing a blank stopping abutment in one plane, a rim-wire guide and pan support in a plane parallel thereto and at the depth of a pan therefrom, means to locate a blank in an intermediate plane, a form onto which the blank is to be folded to form the pan, means to move the form past the rim-wire guide and pan support, and through said intermediate plane to move the blank to and hold it against the abutment, means to fold the blank onto four sides of the form to make a pan having its bottom against the abutment, and having its open end in engagement with the pan support and bent outwardly onto such support ready to receive the rim-wire to stiffen the rim of the pan.

The invention is broadly new, basic and pioneer in that it comprises means for supporting that portion of the metal sheet which is to form the bottom of the pan, and hinged flaps for bending down and folding the other portions of the sheet to form the ends and sides of the pan and to give the set necessary to make the pan hold its form; and also in that section of wire are unrolled by the machine from rolls of wire; and are straightened, cut to proper length and formed in the machine as the wire passes through on its way to the pan.

Means are provided whereby a sheet is placed with the portion thereof which forms the bottom of the pan at rest above a reciprocating sheet lifting form; means are provided against which the form presses the sheet; and mechanical means are provided to fold the ends, sides and corners of the sheet around the form so that the time required for forming the pan is reduced as compared with the folding and pressing operations heretofore known.

The reinforcing wire is straightened out and bent inside the machine and brought into position in opposite sections around the pan at the place where the rim of the pan is to be folded over.

Means are provided whereby the wire for reinforcing the edges of the pan is taken from two rolls, cut off into lengths, each substantially equal to half the perimeter of the pan, and each length is bent into U-shape and after the sheet has been bent into pan form, the wire is applied to the walls of the formed pan; and then the edges of the pan are bent over the wire.

Means are provided whereby the wire introducing mechanism is started into operation by the passing sheet, and is operable only while a sheet is passing through the machine.

Compound side and corner folding hinged flaps are provided whereby the sheet is folded upon four sides and at the corners while the bottom portion of the pan is clamped.

Means are provided whereby the folding is accomplished downwardly by flaps that fold down together toward the sides of the form in order to form the pan.

Parts of the means that bend into form the side walls of the pan, also serve to fold the corner folds over upon the formed end walls of the pan; locking means being provided to hold the corner folding flaps and the side folding flaps in straight and rigid relation to each other so as to partly fold the corner folds at the same time the side folds are folded and set.

An object is to provide a type of machine which may be adapted to make either a flaring or a straight-walled pan or box out of a single blank, by simply making a change with respect to the form and the set of folding flaps pertaining thereto.

An object is to provide a type of machine which is applicable to the manufacture of either flaring, or straight walled wire rimmed pans and in which the change from one form of pan to another may be effected by removing the form and the set of bending, folding and wiring mechanism appropriate thereto and substituting therefor another form and its appropriate set of mechanism.

Other objects, advantages and features of invention may appear from the accompanying drawings, the subjoined detail description and the appended claims.

The accompanying drawings illustrate the invention.

Figure 1 is a fragmental plan of a machine constructed in accordance with this invention omitting the guide which receives the sheet metal blank and guides it onto the slide which carries said blank into the machine.

Fig. 2 is a fragmental view showing parts of the blank carrier slideway and slide with the blank guide in place.

Fig. 3 is a fragmental section on line $x^3$, Fig. 2.

Fig. 3ª is a plan of the cam rod guide plate on the posts shown sectioned.

Fig. 4 is a fragmental elevation of the blank receiving side of the machine, and shows the three single cams 1, 2 and 6, the two double cams 5, 5' and four pairs of cams 3, 3', 4, 4', 7, 7' and 8, 8'; and also the lower ends of cam push rods operated by said cams for feeding, folding, wiring, bending and ejecting; other parts appearing in the front elevation of the machine are also shown.

The cams are numbered in the order of their operation. The single cam for operating the form, and the single cam for feeding the blank, operate simultaneously and are respectively numbered 1 and 2; the pairs of cams 3, 3' for operating the end flaps, and 4, 4' for operating the side flaps, are arranged to operate their parts simultaneously; the pair of double cams 5, 5' are for operating the corner flaps; the single cam that controls the arm for pushing in the wire is marked 6; the pair of cams for bending the edges against the wire are marked 7, 7'; and the pair of cams that operate the mechanism for rolling the rim over the wire are marked 8, 8'.

Fig. 4ª is a diagrammatic developed elevation of the fifteen operative faces of the thirteen cam wheels in Fig. 4.

Fig. 5 is an elevation from the right end of Figs. 1 and 4, showing the blank feeding cam 2 ready to feed a blank to the form.

Fig. 6 is a fragmental plan showing portions of the blank feeding mechanism with a blank fed into place above the form; and also showing a finished pan ejected during the operation of placing the blank in the position for bending.

Fig. 7 is a fragmental section on line $x^7$, Fig. 6, showing the cam 1, the form, and the finished pan intact.

Fig. 8 is a fragmental plan detail showing the position of one of the blank holding and pan ejecting mechanisms when such mechanism is being retracted past the form, a fragment of which is shown.

Fig. 9 is a view of the blank holding and pan ejecting mechanism detailed in Fig. 8, just after the pan has been ejected.

Figs. 10 to 18, inclusive, illustrate the mechanism for operating the end and side folding flaps, the half of such mechanism at the left of Fig. 1 and the parts in the right half of Fig. 1, being complementary thereto and mainly omitted from these views.

Fig. 10 is a fragmental elevation showing the form and other parts in section; and also showing the side folding flaps, an end folding flap, one of the cams 3 which operate the end folding flaps, and one of the cams 4 which operate the side folding flaps; the cam 3 being shown in broken, and the cam 4 in solid lines.

Fig. 10' is a plan view of one of the end flaps.

Fig. 11 is a fragmental view showing the form in section and also showing one of the end folding flaps, one of the side folding flaps, one of the cams 3 which operate the end flaps; and one of the cams 4 which operate the side flaps. A portion of one of the corner flaps is also shown.

Fig. 11' is an end elevation of one of the end flaps.

Fig. 12 is a fragmental plan of side, end and corner flaps, a corner flap bar, and portions of the mechanism for operating and for locking the corner flap bar.

Fig. 12' is a side elevation of one of the end flaps.

Fig. 13 is an elevation showing the cam $5^b$ of the double cam wheel 5; an end flap and two side flaps folded upon the form, and the parts operated by the pair of double cams 5, 5' to fold and unfold the corner flaps; the end and side flaps are shown in folded position.

Fig. 14 is a fragmental edge view of the double faced cam 5 and the folding and locking devices operated by the cams 5, 5'; said devices being shown in the position appropriate to Fig. 13.

Fig. 15 is a fragmental plan view of the folding and locking devices shown in Fig. 14.

Fig. 16 is a fragmental view showing the double faced cams 5 and folding devices in position at final closing of the corner flaps. It also shows the end folding flap in rest position after folding the end folds.

Fig. 17 is a fragmental view at right angles to Fig. 16, showing the position when the end folding flaps are raised after folding the ends, and the side folding flaps are down and the corner folding flaps are closed.

Fig. 18 is a fragmental plan analogous to Fig. 15 showing the parts in corner folding position.

Fig. 19 is a fragmental view partly in section showing the cam 6 and the wire placing and holding arms and jaws which are operated thereby, also the rim-wire way and pan support.

Fig. 19$^a$ is a fragmental plan of the rim-wire way and pan support.

Fig. 20 is a fragmental view of some of the parts shown in Fig. 19, including the wire placing and holding jaws.

Fig. 20$^a$ is a plan of one of the wire placing and holding jaws.

Fig. 21 is a plan view of the frame to which the rim forming parts are connected. The cam plate and rollers are also shown.

Fig. 21$^a$ is a section on line $x^{21a}$, Fig. 22, the rim folders being shown at rest, and an end flap being shown in position just before final bending of the ends and sides.

Fig. 22 is an elevation partly in section on line $x^{22}$, Fig. 21$^a$ with the jaws holding the wire in place.

Fig. 22$^a$ is an exaggerated fragmental detail showing the first step in wiring the rim.

Fig. 23 is a fragmental section showing a jaw holding the wire down, and rim forming plates raised by cam 7 bending the rim perpendicularly against the wire.

Fig. 23$^a$ is an exaggerated fragmental detail illustrating the rim wiring.

Fig. 24 is a fragmental section of the rim forming plate at rest when the cam 7 has raised said plate to its height and cam 8 has spread said plates at the bottom, causing the tops to roll the blank over the wire.

Fig. 24$^a$ is a view analogous to Figs. 22$^a$ and 23$^a$ illustrating the rim finishing step shown in Fig. 24.

Fig. 25 is a fragmental plan showing one set of the wire straightening rolls and the shaft which operates such rolls; wire bending arms and the wire cut-off mechanism are also illustrated. The parts are shown in the position for feeding the wire.

Fig. 26 is an enlarged fragmental view of the wire cut-off shown in Fig. 25, with wire in place ready to be cut.

Fig. 27 is an enlarged fragmental end view showing the wire cutter-bar in operation and wire clutch push-rod retracted.

Fig. 28 is an elevation of parts shown in Fig. 25.

Fig. 29 shows the thrust block in place, when the metal blank is in the machine and the wire rolls are closed and wire cutter bar retracted.

Fig. 30 is a plan of the wire bending apparatus when at rest. A piece of wire of proper length is shown in position to be bent.

Fig. 31 is a view analogous to Fig. 30 showing the position of parts after the wire has been bent.

Fig. 32 is a fragmental section on line $x^{32}$, Fig. 31.

Fig. 33 is a fragmental plan of the mechanism for feeding and ejecting the wire when there is a sheet metal pan-forming blank in the machine.

Fig. 34 is a fragmental detail showing the thrust block with hole open.

Fig. 35 shows the thrust block with hole closed.

Fig. 36 is a side elevation of the parts shown in Fig. 33.

Fig. 36$^a$ is an end view on line $x^{36a}$, Fig. 36.

Fig. 37 is a fragmental detail showing a blank in the machine as it strikes the lever that closes the thrust block hole, causing the clutch-closing rod to operate the wire roller clutch.

Fig. 38 is a view analogous to Fig. 36 showing the wire ejecting fingers holding the wire in place, when no blank is in the machine.

Fig. 39 is an enlarged view showing the wire ejecting fingers holding the wire.

Fig. 40 is a plan of a blank immediately after the end flaps have been started to fold.

Fig. 41 is a side elevation of the blank shown in Fig. 40; the form is also shown supporting the same.

Fig. 42 is a plan of the blank after the ends and sides have been formed and before the corner folds have been folded in.

Fig. 43 is a side elevation of what is shown in Fig. 42 including the form and its push rod.

Fig. 44 is an end elevation of what is shown in Fig. 42 and Fig. 43.

Fig. 45 is a plan of the blank folded ready to receive the rim wire sections which are shown ready for insertion into place.

Fig. 46 is a side elevation of what is shown in Fig. 45, omitting the wire. The form and push rod are also shown.

Fig. 47 is a plan of the completed pan.

Fig. 48 is a view of the completed pan on the form and rim supports.

Circled arrows are applied to some of the views to show the direction of sight for other views; the ordinals of such other views being enclosed within the circle. Thus, in Fig. 1, the circled arrows 4, and 5 indicate the direction of view in Figs. 4 and 5 with respect to Fig. 1; likewise in Fig. 4, the circled arrow 5 shows the direction of sight for Fig. 5 in Fig. 4; and in Fig. 5 the circled arrow 4 shows the direction of sight for Fig. 4, and in these views the circled arrows 1 indicate the direction of sight for Fig. 1.

The machine as shown is arranged to form a flaring pan; but it is understood that the machine is applicable to the manufacture of rectangular pans with, and also without, flare, and is adapted to make the pans from any suitable sheet material and of any proportions and dimensions; and in the following description in this specification the term "end" is used to indicate the part that is first folded against the form, and the term "side" is used to indicate the part that is next folded, irrespective of the comparative lengths of such parts.

It is understood that the frame of the machine, and also the various parts of the machine may be variously constructed without departing from the spirit of the invention; but the form shown is at present deemed most desirable for easy and cheap construction and ready interchange of parts in changing from the manufacture of pans of one shape or size, to pans of a different shape or size.

The cam shaft 9 on which the cam wheels 1, 2, 3, 3′, 4, 4′, 5, 5′, 6, 7, 7′, 8, 8′ are fixed, is journaled on the bearing supports 10, 11 that are mounted at the ends of the frame on upright corner posts 12, 12′. The bearing support 10 is a cross bar provided at its ends with holes through which the upright posts 12 at one end of the frame, extend. The bearing support 11 at the other end of the frame is constructed with two cross bars 13, 14; the bar 13 being mounted on posts 12′. The cross bars 13, 14 are connected together by side pieces 15 and 16. The posts 12, 12′ are held upright by a cast-iron base 17 cored out underneath at the corners as at 18, to accommodate the base heads 19 of said posts 12, 12′. Each post is provided with spacers in the form of sleeves to support the horizontal members of the frame.

The bottom spacers 20 on the posts 12, at the receiving side of the frame, support the sleeves 21 of the bracket arms 22 which support the front edge of the table 23; and above the sleeves 21 are spacer sleeves 24 on which the ends of the bearing supports 10 and 11 rest.

Each of the spacers 25 at the rear of the machine is equal in length to the combined lengths of a spacer 20, a sleeve 21, and a spacer 24 at the front side of the frame, so that the bearing supports 10 and 11 are held in parallelism with the base 17. Spacers 26 26′ on the posts 12, 12′ support the cam-rod guide bar 27.

Said cam rod guide bar is carried by a frame comprising end bars 27′, which are provided with sockets 28 that are exactly fitted to the four posts 12, 12′ and which end bars rest on the four spacers 26, 26′. On the receiving side of the machine the posts 12 are provided with spacers 29 that rest upon the front sockets 28 and that fit the posts 12. The upper table sockets 30 likewise fit the posts 12; and spacers 31 on said posts 12 support the front side of the folder support 32 that is a cross piece provided with four sockets 33 that fit the posts 12 and 12′. The space on each rear post between the rear sockets 28 and 33 is filled by a spacer 34, and the length of each of said spacers 34 is equal to the combined length of a front spacer 29, a socket 30 and a spacer 31 on a front post of the machine between the cam-rod guide 27 and the folder support 32.

Spacers 35, 35′ on the posts 12 and 12′, rest upon the sockets 33 and support the top frame member 36 which is provided with sockets 37 for the posts, and is held in place by the nuts 38.

Owing to the accuracy and rapid service required, and the desirability of so making the machine that parts can be removed and other parts substituted to make the different sized pans, it is necessary that the sockets be reamed so as to fit the posts with a sliding fit; and when the nuts are screwed down, the several cross pieces 10, 11, 27, 32 and 36, and also the bracket sockets 21 and 30, are clamped tightly onto the base 17.

The cam shaft 9 is revolved by suitable means indicated by the pulley 39; and as the cams revolve, they operate their respective connections in perfect time relation to each other.

The sheet metal blanks 40 from which the pans are to be formed, are suitably stamped out with the side-forming edges a, end forming edges b and the corner edges c, and are shown as being of elongate octagonal shape, see Fig. 6.

The table 23 is provided with a sideway 41 in which a blank-carrier comprising a frame 42 is reciprocated horizontally by lost motion means; the cam 2 operating through suitable means as the push-rod 43, reciprocating through the bearing 44 and pivotally connected by a lost motion link 45 with a lever that includes a short-arm 46, a rock-shaft 47 pivoted to the edge of the table 23 and to the side piece 15, and also the long arm 48, balanced by anti-shock springs 48″. Said lever is provided in its long arm, with a lost motion slot 49 in which is mounted a sliding block 50 that is pivoted to the blank-carrier 42 which is operable by said arm to center the blank above the vertically reciprocating form 51 as indicated in Fig. 6.

The blank-carrier frame is provided inside at its outer edge and two opposite adjoining edges, with a ledge 52 to support the blank 40; and said carrier is open at the side toward the form 51; and the orifice 53 inside the ledge is such as to allow the form to move through the carrier as indicated in dotted lines in Fig. 7, for the purpose of lifting the blank 40 from the carrier.

In Fig. 4ª the positions of the thirteen cams at the moment illustrated in Figs. 1, 4 and 5 are shown. The roller 54 of push-rod 43, and its cam 2 are in position to hold the carrier retracted, and said carrier has been held in this retracted position for one full half revolution of the cam shaft. During the stationary period of the carrier for said full half revolution, a sheet metal blank 40 has been deposited through guide 55 onto the ledge 52 in the carrier and is ready to be carried by the carrier into position above the top of the form 51, which at that moment is at the point of being retracted as shown by dotted lines in Fig 7 As the cam shaft turns from this position, the cam 1 retracts the form, and the cam 2, revolving in the direction of the arrow, centers the blank over the form, and cam 1, through its roller 56 and push-rod 57, causes the form to lift the blank from the carrier and press it against the abutment or piece 58 of the folder mechanism which abutment forms a stop for the blank 40 as indicated in dotted lines in Fig. 7 and in solid lines in Fig. 10.

Said abutment 58 is stationary, being fixed to folder support 32; and there are hinged to said abutment the end folding flaps 59 by hinges 60, and the side folding flaps 61 by hinges 62. The cams 3, 3′ operate through their rollers 63, push rods 64, yoke 65 and links 66 to operate the end flaps 59.

When the form 51 presses the blank 40 firmly against the underside of the abutment 58, the cams 3, 3′ will hold the rollers 63, and consequently the push rod 64 and yoke 65 in elevated position; but as the cam shaft revolves from the position in Figs. 10 and 11, the rollers 63 are depressed by the cams 3, 3′ thus starting the yoke 65 and the end folding flaps 59 down.

The pair of cams 4, 4′ are arranged with respect to their rollers 67 connected by push rods 68 to the yoke 69 which in turn is connected by the links 70 with the side flaps 61.

The cams, 3, 3′, 4, 4′ and 5, 5′ are so timed that after the form has fully pressed the blank against the abutment 58, the end flaps are first slightly depressed so as to start to fold the end portions of the sheet; and then they are quickly followed downward by the side flaps 61 and both folding mechanisms are then operated in such time that the end flaps and side flaps finally drive the folding ends and sides against the ends and sides of the form, almost at the same instant; then the end flaps are fully raised, thus clearing the way to allow the corner flaps 72 which are four in number and are hinged to the ends of the side flaps, by hinges 71, to be folded toward the longitudinal axis of the form.

The end folding flaps 59, have side wall extensions 59′, see Figs. 10, 10′, 11, 11′, 12, 12′, 13, 15, 16, 18, against which side walls the corner folds are formed, while the ends and sides of the pan are being formed.

The cams 5ª and 5ᵇ (see Figs. 13, 14, 15, 16 and 17), with their rollers 73, operate two pairs 74, 74′ of corner-flap operating cam levers that are fixed respectively to horizontal rock shafts 75, 75′ that rock in bearings 76, 76′ of the frame 27. (See Figs. 3ª, 5, 13 and 16.) Said rollers 73 are swung simultaneously out by the cams 5ª and 5ᵇ to move the bars 77 and 77′ toward each other to close the corner folds g onto the end walls of the pan. Said levers extend up from the cam wheels 5 and 5′ and are forked or notched at their upper ends to seat and operate two horizontal corner-flap operating bars 77, 77′ having central orifices 77ª, and arranged to slide on arms 78, 78′ that are rigid to the side flaps 61 and extend through said orifices and that act as guides for the bars 77, 77′ when the same are moved by the levers 74, 74′. Said corner-flap operating bars are adapted and arranged to be moved downward by the side flaps 61 and parallel to said side-flaps, and to drop into the forked ends 74ª of the cam levers 74, 74′ when the side flaps 61 are depressed by the links 70 operated by the yoke 69 push rods 68 and cams 4, 4′. (See Figs. 10-18.)

Links 79 connect the corner flap operating bars 77, 77′ near their ends to the four corner flaps 72. (See Figs. 11, 12, 13, 14, 15, 16, 17 and 18.)

The side-flap arms 78, 78' are rigid to, and project at right angles from the centers respectively of the side flaps 61 to act as guides for the corner-flap operating arms 77, 77', when the side flaps are down (see Figs. 13, 15, 16, 18), and are provided at their outer ends with stops 78ª for the corner-flap operating bars. Said stops are shown as formed by bending the ends of said arms downward so as to limit the outward throw of the bars 77, 77'.

Rollers 80 are mounted on pins 81 in orifices 77ª in the bars 77 and 77' to form anti-friction supports for said side flap arms 78, 78', to relieve the upward strain on the corner flap hinges 71, and to act as an outward stop for rollers 80 on the bars 77, 77'. Said rollers 80 strike the stops formed by the curved ends of extension arm 78, 78', just as the corner flaps 72 have completed their return to their retracted positions, thus to hold the corner flaps of each side flap in alignment with such side flap, prior to bending the corner folds.

The bars 77, 77' carry locking pins 82 (Figs. 12, 13, 14, 15, 16, 17, 18), controlled by spring 83 adapted to hold said pins engaged with such side flaps prior to bending the corner folds. Said pins 82 engage the side flap arms 78, 78' and are held in locked position by coil springs 83, that act to force the locking pins into sockets 84 in the arms 78, 78' to keep the corner flaps in a common plane with the side flaps during the operation of folding the blank toward the sides of the form. See Figs. 12, 14, 15 for locked position and Figs. 16, 17, 18 for the unlocked position.

Particularly referring to Figs. 10–18, there are provided underneath the corner flap operating bars 77, 77' two lock trip levers 85 to lift the locking pins 82 from their sockets 84. When the ends of the bars 77, 77' drop into the forks of the four corner-flap operating cam levers 74, 74', the lock trip levers 85 press against the rim-wire guide ways 86, thereby moving the locking pins 82 out of the sockets 84, and holding said pins in nonlocking position, so that the four corner flaps 72 are released that they may be operated to bend the corner folds g against the ends of the pan. (See also Figs. 42–46.)

As the corner flaps 72 are returned to the plane of the side flaps 61, said side flaps are started on their return up stroke and lift the lock-trip lever 85 from the rim wire-way 86, thereby allowing the springs 83 to push the locking pins 82 into the sockets 84 on the arms 78, 78', thus locking two corner flaps 72 to each side flap, so that the three flaps on each side are in rigid relation and will operate as a single unit while bending the sides of the blank down against the form 51. The corner flaps 72 are locked to the side flap 61 and operate as a single unit therewith at all times, except when the four corner flaps 72 are required to be operated to fold the corner folds g of the pan, at which time the locking pins 82 are raised by the lock trip lever 85 striking the rim-wire guideway 86 thus allowing the bars 77, 77' to slide on the arms 78, 78' toward the side flaps 61, and to return to the stops 78ª at the outer end of the arms 78, 78' whereupon the bars 77, 77' are again firmly locked by pins 82 as shown in Figs. 10–15.

As the two end flaps 59, and the two side flaps 61 are depressed by cams 3, 3' and 4, 4', thereby bending the ends and sides of the blank 40 down over the edge of the form 51, the blank extends beyond the lower edges of the end and side flaps, as shown in Figs. 21 and 37.

The rim-wire guideway comprises two rails 86 that are connected together by a web connection forming two sides of an open ended box 86' the inside of which conforms in cross section to the inside of the mouth of the pan to be folded and which box reinforces the rim-wire guideway and forms a flush continuation of the tops thereof; and as the flaps fold the blank completely onto the sides of the form to make the pan walls, they bend the edges of the pan wall onto the top of the box so that the pan remains thereon at the plane of the rim-wire guideway.

87 and 88 are rim forming members in the form of plates hinged to the vertically reciprocating frame 89 by hinges 89' midway between the top and bottom edges of the rim forming plates. Said frame is operated up and down by cams 7, 7' through rollers 87' and cam rods 88'. The cams 7, 7' are so constructed and arranged that the frame 89 is held down in the position shown in Figs. 21ª and 22 during almost the entire revolution of the cam as indicated in Fig. 22; and the plates 87, 88 are thus held with their top edges in the plane of the rim-wire guideway 86, below which plane the form 51 may slightly extend as indicated in Figs. 21ª, 22.

The top edges of the rim forming plates are provided with inwardly projecting rim folding lips 90 that form ledges flush with the top of the rim-wire guideway 86 and box 86' onto which ledges the edges of the blank are forced by the end and side flaps 59 and 61.

The blank carrier slideway 41 supports the blank carrier frame 42 at a level between the levels of the top of the rim-wire guideway 86, and the under face of the blank stop or abutment 58; and the vertical reciprocation of the form 51 moves the top of the form from below the level or plane of the rim-wire guideway 86 through and beyond the plane of the blank carrier slideway 41; and the carrier is adapted to place the blank in the path of the form (see Figs. 6 and 7);

so that the top of the form will lift the blank from that level to the high level of the blank against the undersides of the stationary blank abutment 58 and raised folding flaps 61, as indicated in dotted lines in Fig. 7, which high level is the depth of a completed pan above the level of the top of the rim-wire guideway 86, and is less than the projection of the blank beyond the edges of the form 51, so that when the flaps fold the blank down onto the form, the projecting edges of the blank will be bent between the edges of the flaps and the top of the rim-wire guideway 86 and web or box 86', thus to provide marginal folds of the blank to receive the rim wires which will subsequently be moved thereonto from the rim-wire guideway and box which will support the out-turned margins of the pan and will form a support over which, at the close of the next advance of the blank carrier 42, the pan will be thrust by the pan ejectors 164 on the carrier as it locates the succeeding blank over the retracted form 51 as seen in solid lines in Fig. 7.

The rim-wire guideway and box thus forms a support for the pan from the moment the blank is fully bent until the pan rim is wired and the pan given the impulse that ejects it from the machine.

When the flaps fold the blank onto the form 51, the edges of the blank are bent into the corners formed by the horizontal faces of the lips 90 and the top of the rim-wire guideway 86 and box 86', and the side and end walls of the form 51; so as to form the sides $d$ and ends $e$ of the pan and also the rim flange $f$. By this operation a set is given the blank at the bends between the pan walls and the rim flanges. The end flaps are then raised and the corner flaps are unlocked and operated by the horizontal bars 77, 77' to fold the corner folds $g$ onto the end walls $e$. Then the corner flaps are returned to alinement with the side flaps and are relocked to said side flaps, and the side flaps and corner flaps are then raised, thus leaving the partly formed pan ready to receive the U-shaped rim wires $h'$, each of which is formed of a section of wire cut from a coil, not shown, and bent into U-shape and then placed in the angle between the rim flanges $f$ and pan walls, with the ends of said U sections adjacent each other at the middle of the ends of the pan; as indicated in Fig. 47.

In the operation of producing the U-shaped rim wire-sections, the wires from the two coils, not shown, are first straightened by passing through suitable rolls.

In the drawing there are shown two sets 91, 91' of wire-straightening rolls (see Figs. 1, 4, 5, 25, 28, 33, 36 and 38); by which the wires are respectively straightened on their way from the wire coils not shown, to the cutters 92 and wire benders 92'.

Each set of wire straightening devices comprises frames 93, 93' and rollers carried by said frames. The upper stationary frame 93 is fixed to the folder support 32 and the lower frame 93' is adjustable toward and from the upper frame. A master roller 94 is journalled in each upper frame and each roller 94 is alined with and is fixed to a driving shaft 95 which is operated by a pulley that is continuously driven during the operation of the machine.

Each driving master or wire drawing roller 94 cooperates with a driven master roller 94' and the axes of the master rollers 94 and 94' are in a plane at right angles to the path of the wire and said rollers are geared together so that a wire gripped therebetween will be positively driven in the direction of the shaft 95.

The upper stationary frame is also provided with three wire straightening rollers 97 revolving loosely on pins 98 carried by the upper fixed frame; and the lower adjustable frame 93' is provided with three wire straightening rollers 99 revolving on pins 99' carried by said lower frame 93', which is vertically adjustable relative to the upper frame by means of set screws 100 screwing up through a downward extension 101 of the upper stationary frame 93.

By adjusting the screws 100, the rollers are made to grip the wires $h$ on their way from the coils, not shown, to the cutters and benders.

The upper and lower wire straightening rollers 97 and 99 are shown in the drawings in staggered relation to each other, while the power driven wire drawing rollers 94 and 94' of each set are mounted with their axes in a plane at right angles to the path of the wire so that they can be made to grip the wire to draw the same along their path between the loose wire straightening rollers 97 and 99, so that as the wire is drawn past the loose rollers it is straightened thereby.

It is necessary that the mechanism for supplying the wire reinforcements to the rim of the pan shall not operate to advance the wire except at the proper time during the operation of the machine upon a blank; otherwise the machine would become clogged with the rim re-enforcing wires; and with this in view, the lower wire drawing roller 94' is adjustable toward and from the master roller 94 and is mounted on an adjustable clutch arm 102, by which said roller may be moved toward and from the master roller.

Said master roller is provided with driving gears 103, that mesh with driven gears 103', fixed to the driven roller 94', that is journalled to the clutch arms 102, which are pivoted at 104 to the upper stationary frame 93 in front of the receiving side of the clutch rollers.

The clutch arms extend beyond the rear of the clutch rollers for a considerable distance and the weight thereof, and of the roller 94' tends to normally hold said roller out of wire clutching position, and has to be operated by other parts of the machine in order to cooperate with roller 94 to grip and advance the wires. The machine is so constructed as hereinafter described that the clutch is operated to move the wire into the machine only while a blank 40 is being formed over the form 51. This is effected by action of the edges of the ends of the blank 40 at the close of the folding operation, at a time when the end flaps have so bent the ends of the blank that they project sufficiently beyond the end flaps to engage a part the end flaps pass. To this end, arms 105 of rock shafts 106, 106' which rock in bearings 107 are so arranged in the way of the end edges of the blank 40, that when the final folding of the ends of the blank is being effected, the rock shafts will be engaged by the ends of the blank and rocked in their bearings 107 to operate rock arms 108 and tie rods 109 and thrust blocks 110 that are adapted and arranged to be moved by this operation to close thrust rod ways 111 in the clutch arm 102. The thrust blocks 110 are pivoted to the clutch arms 102 by bolts 112 and are adapted to open and close said ways 111, which are arranged to allow clutch closing thrust rods 113 to play freely through the clutch arms, except when said ways 111 are closed by the thrust blocks. The thrust of the rods 113 on the blocks operates the clutch arms to close the clutch and hold it closed on the wire so that the rollers of the clutch advance the wire until the ends of the wire operate means to move the thrust blocks out of the way of the rods 113.

When the blocks are moved out of the way of the clutch rods, they so remain, as in Figs. 34 and 38, thus showing that the machine is running idle, and the reciprocating clutch rods 113 play through the holes 111 and move without lifting the roll 94' and said roll does not engage the wire and no wire is fed.

When the thrust blocks receive the thrust they lift clutch arms 102, and force the lower roller 94' against the wire $h$, and the wire against master roller 94, and said rollers 94, 94' force the wire which is between them past wire cutters 114, Figs. 25, 26 and the wire bender blocks 115, Figs. 25, 30, 31; and thence through wire guide grooves 116, Figs. 30, 31, 32, past the further pair of wire bender blocks 115', until the wire strikes the clutch trip levers 117, (Figs. 33, 36), which operate through pivot levers 118, and pivot bolts 119, connect clutch releasing rods 120, to the thrust blocks through rods 109 at connections 121, and move the thrust blocks 110 from the holes 111, thereby freeing the clutch arms 102, which allows the roller 94' to lower, thus stopping the wire feed.

122 indicates cutter blocks fixed to the folder support 32 to hold the wire to be cut by co-action therewith, of cutter bars 92, which are pivoted to the folder support 32, by bolts 124.

The cutter bars 92 are operated through levers 125 and bell cranks 126, by push rod 64, shown in Figs. 27 and 29. Said bell cranks 126 are pivoted by bolts 127 to a cross member of guide bar 27. Figs. 3ª and 5. Push rods 64 which are operated by cams 3, 3' also operate the end flaps 59; consequently the ends and sides of the blank are folded at the same time that the wires are cut into their proper lengths.

There are two wire bending forms 128 containing grooves 116 (see Figs. 25, 30, 31 and 32), which are underneath and fixed to the folder support bar 32, and around which forms, the wire sections are bent into form by the wire bending blocks 115, 115', that are operated by links 129, two horizontal wire bending bars 92', four upright oscillating levers 130, linked to four upright corner flap cam levers 74, (Fig. 29) by four links 131, which forms 128 are so located on opposite sides of the machine; that when the finished bent wires $h'$ are released, they drop directly into the rim-wire guideway 86, just in front of the wire placing and holding jaws 132 of oscillating arms 133', 133'' shown in Figs. 5 and 19.

The jaws 132 are elongated plates, each equal in length to the width of the rim-wire guideway 86, and to the length of each bent wire $h'$. Said plates are provided with slots 132' through which the head 133 of the oscillating operating arms 133', 133'' may move. Said heads 133 form shoulders which overhang the jaws 132 as shown in Fig. 19 at the time the edges of the blank are being turned up outside the wires preparatory to being bent over the wires.

The four upright oscillating levers 130, are pivoted by pivots 134 at their lower ends to arms 134', fixed to the corner post sleeves 20, 25; Figs. 4, 5, 28 and 29, and the upper ends of said levers are pivoted to the horizontal bending bars 92', Figs. 25, 28.

The clutch closing rods 113 which operate the wire roll clutch arms 102, Figs. 27, 29, are pivoted to the lower ends of the bell cranks 135, which are pivoted at 135' to the guide bar 27, Fig. 3ª. The upper ends of the bell cranks 135 are pivoted to horizontal wire bending bars 92' and through four upright levers 130 and four links 131 which are connected to the four corner flap operating cam levers 74, 74' that are operated by the double faced cams 5, 5', consequently the two U-shaped wires 86' are bent on opposite sides of the machine at the same time that the four corner folds g of the pan are being bent against the ends of the partly formed pan.

The two pairs of wire ejecting and holding fingers 136 (Figs. 33, 36, 38, 39), are coupled together in pairs by rods 137, and said pairs are connected by rods 138, to bell cranks 139, which are pivoted at 140 to the folder support 32 and are operated by wire clutch arms 102, that are operated only, when the wire roll clutch arms are closed by a blank 40 as before described, thereby ejecting the finished wires h', as shown in Fig. 36. In case no blank is fed into the machine, the clutch arms 102, remain open and the finished wires are held firmly, as shown in Figs. 38 and 39.

When the finished wires h' have been ejected by the wire ejectors 136 into the rim-wire guideway 86, they are carried sidewise by the wire placing and holding jaws 132, arms 133', 133'', Figs. 19 and 22, into position, each embracing one-half of the pan; one of wires h' being carried by wire arm 133', and another of said wires 86' being carried by wire arm 133''. The two wires practically extend all around the pan.

Wire arms 133', 133'' are operated by a horizontal sliding push rod 141, which is transverse to and axially in the same plane with the cam shaft 9 and which slides in bearings 142, 142', Fig. 19.

Said bearings 142 and 142' extend through the stationary cross bars 144 and 145, respectively; see Figs. 1, 4, 5 and 19. The cross bar 144 is bolted by bolts 143 to the upper sides of the cam shaft bearing supports 10 and 11 on the receiving side of the machine, and cross bar 145 is bolted to the lower sides of the cam shaft bearing supports 10, 11 on the rear or pan ejecting side of the machine.

One of the wire placing and holding arms 133' is pivoted to the cross bar 144 by a bearing 146, and the other of said arms 133'' is pivoted to the cross bar 145 by bearings 147. See Fig. 19.

Horizontal sliding bar 141, which, through roller 148 is operated by cam 6, is connected to arm 133' by a slot and pin lost motion connection 149 and to arm 133'' by the slot and pin lost motion connection 150. Said arms 133', 133'' are shown in their outward position in Fig. 5.

After the two bent wires h' have been placed by the jaws 132 of the wire placing and holding arms 133', 133'', Figs. 19, 20 and are held firmly in place by said jaws 132, the end rim forming plates 87 and the side rim forming plates 88 push the metal of the blank which extends over the lips 90 of said plates, as shown in Fig. 22, into upright position, encasing the wires 86' as shown in Fig. 23.

The jaws 132 are provided with end extensions 132ª and hold the wire sections h' at both the sides and ends of the pan. When the oscillating arms 133', 133'' are started on their return stroke by cam 6 turning in the direction of the arrow in Fig. 19, they release the two wire holding jaws 132, Figs. 24, 24ª.

Two trip blocks 153 are bolted on one of the cams and are adapted to strike levers 154, which are pivoted at 155, and arranged to operate rods 156, that connect to cross plates 157 which are coupled to the wire holding jaw 132 by bolts 158, Figs. 19, 20. The parts are so arranged that when the two jaws 132 are released by arms 133', 133'' and said arms start on their return stroke, said jaws are instantly thrust upward by the two trip-blocks 153, Figs. 19 striking levers 154.

Coil springs 159 are fastened to trip levers 154 so as to hold the wire holding jaws 132 firmly down against the wire slideways 86 at all times except when the trip blocks 153 push the wire holding jaws 132 upward to clear the way for the rim forming plates 87, 88, which at that time begin to roll the metal over the wires as shown in Fig. 24.

When the four rim forming plates 87, 88, Fig. 23, reach the top of their stroke, pushing the projecting flange of the blank 40 into an upright position, and the wire holding jaws 132 have been thrust upwards by the trip blocks 153, the horizontal cam plate 160, containing anti-friction rollers 163, Figs. 21, 22, 23, 24, 40, is raised by push rods 161, rollers 162 and cams 8, 8', thereby spreading the bottoms of rim forming plates 87 and 88, Fig. 24, which are hinged to the rim forming frame 89 by hinges 89'. This swings the tops of the four rim forming plates 87 and 88 toward the form 51, which rolls the upright flange over the wires h' on the four sides of the then finished pan.

Horizontal cam plate 160 and the rim forming frame 89 are then lowered by cams 8, 8' and 7, 7'. The form 51' is then withdrawn from inside the finished pan by cam 1, leaving the finished pan resting on the rim-wire guideway 86, from whence it is ejected by the pan ejectors 164, which are hinged to the front end of blank carrier 42, by bolts 165, Figs. 6, 7, 8, 9, when said blank carrier 42 again slides above the form 51', to deposit a blank 40 for the next pan.

The carrier has pan ejectors 164 which are hinged to the carrier frame 42, by bolts 165. and held closed against the end of the frame 42 by coil springs 166, at all times, except when the carrier is being retracted past the form 51', which has been raised to press the blank 40 against the center folder plate 58, at which time the pan ejectors of the carrier open while passing form 51', as shown in Fig. 8.

A vertical bearing support 167 is fixed stationary to the center of the upper cross frame 36, and extends downward, seating in the center of folder support bar 32, Figs. 1, 4, 5, 10, 11, 13 14, 16 and 17. Yoke 65 operated by push rods 64 and cams 3 and 3'; and yoke 69 operated by rod 68 and cams 4 and 4', reciprocate on said bearing support 167.

An opening 168 is cut into one or more of the side and end flaps, in which opening, numbers or letters may be fixed for numbering or lettering the pans, Fig. 16.

In practical operation the cam shaft 9 and its cams are driven by any suitable means at an economical speed which may range from 35 to 100 revolutions per minute depending upon the size of the pan and thickness of the stock. This sets into operation the various parts hereinbefore described. The blanks are fed by any suitable means to the carrier which places the blank over the lowered form as indicated in solid lines, Fig. 7.

The blank carrier remains stationary while the form comes up as indicated in dotted lines in Fig. 7, and in solid lines in Fig. 11 and clamps the blank 40 against the abutment 58, where it is held as indicated in Fig. 10, during more than one half of a full revolution of the cam 4, during which period the end flaps are forced downward about a third of their way, and then the side flaps start downward with a more rapid speed so that all four flaps come to the completely folded position at the same time.

The blank is of such size relative to the form that when the portions which are to form the rims of the sides and the ends of the pan are turned outwardly at a right angle as indicated in Fig. 22$^a$, the rim flanges $f$ overlap the folding lips 90 sufficiently to enfold the bare portion of the wire located in the angle between the pan walls and the rim flanges.

Then the end flaps are withdrawn upward and the side flaps remain stationary while the folded corner sections 72 of the side flaps are swung around toward the folded end walls of the pan, thus swaging the corner folds against the end walls of the pan with such force as to give the bend a positive set against such end walls.

The end wall forming portions of the blank are wider than the end flaps, and the downward movement of said flaps causes the projecting edges of such end wall forming portions to actuate the levers 105; and this closes the wire clutches which draw the wire through the wire straightening rolls; and when the wire $h$ reaches the wire clutch trip stop lever 117 on the further side of the form, thus giving the wire a predetermined length, the wire clutch is disengaged and this stops further feeding of the wire.

Then the knife which is operated by the end flap push rod cuts the wire; and the wire benders, which are operated by cams 5, bend the ends of the wire at right angles.

Then the wires at their ends form the limbs that fit around the end of the pan. Then the wire sections are held in that position until the wire clutch is closed. The wires in due time are dropped by the wire holder clippers, and are then pushed around the pan by the wire placing and holding arms 133.

They are dropped in the rim-wire guideway, then pushed around the pan from opposite sides when the wire is brought in each way. Thereupon the rim-formers 88 are moved upward as indicated by comparing Figs. 22$^a$ and 23$^a$, and then the jaws 132 which are part of the wire placing and holding arms are raised and the rim roller completes the operation of rolling the flange over the wire.

The rim roller members 87 and 88 are moved inward from the position shown in Fig. 23$^a$ to the position shown in Fig. 24$^a$, thereby completing the rim roll over the wire. The rim roll levers are then lowered, which clears the path for the pan to be ejected. Then the form is lowered and the carrier retracted while the folding operation was proceeding the carrier was retracted to position ready to receive a second blank. This is fed in the same manner as the first blank, and the carrier moves said blank to the center of the machine as above described with relation to the first blank, and as the carrier performs this office it also strikes the completed pan and ejects it from the machine.

When the machine is thus started into operation a pan is completed at each revolution of the cam shaft, and a previously completed pan is ejected by the carrier as it places a succeeding blank over the form.

I claim.

1. In a pan making machine, a pan forming mechanism comprising a form and oppositely arranged compound side flaps, each composed of a middle and two end sections, the end sections being hinged to the middle section; means to lock the sections into flat rigid relation; means to move the locked flaps downward to fold a blank against the form; means for unlocking the corner flaps; means to fold the corner flaps toward the form, means to retract the flaps; and means to lock the corner flaps to the side flaps as they start on their return.

2. In a pan making machine, a form; means to fold a sheet to form end and side walls, and corner folds; means to form a projecting rim on said end and side walls; stationary means to support said rim, and means to lower the form from the completed pan while it is supported by the rim.

3. In combination with a form adapted to support a blank; hinged end flaps and side flaps adapted to fold the blank down toward the form with the end flaps foremost in starting and completing the folding operation; the means for folding the side flaps being adapted to allow the side flaps to open to release the end flaps and allow them to be retracted; and means to return the side and corner flaps to complete the corner folding operation.

4. A pan making machine comprising a form; a guideway for a blank; means to move a blank along the guideway onto the form; means to first hold the folded blank upon the form to form opposite walls of the pan; means cooperating with said folding means to fold the blank on opposite sides of the form; and to produce folds at the four corners of the form; means to fold the corner folds onto the folded blank; means to bend the edges of the folded blank to form a flange to receive rim wire; means to apply rim wire to the rim of the folds; and means to close the rim over said rim wire.

5. A pan making machine comprising a frame; a shaft journalled to said frame; cams on said shaft; a slideway for blanks; a form; a cam mounted on said shaft; means connecting the cam to the form to reciprocate said form vertically; means connected to others of said cams to fold the blank onto the form to form a pan; means to support the pan while the form is operated by its cam to withdraw the form from the pan thus leaving the pan free in the path of the blank so that upon the movement of a subsequent blank the pan may be ejected.

6. In a pan making machine of the character set forth provided with a slideway and means to slide a blank along said slideway; the combination with a form, of hinged folding mechanism whereby the blank will be folded upon the form; means whereby the form is lowered therefrom, and a cam shaft with cams thereon to operate the blank moving and folding mechanism.

7. In a pan making machine provided with a form, a cam and a push rod operated by the cam; a guideway; a blank carrier movable in the guideway; a lever including a short arm, a rock shaft and a long arm; lost motion means connecting the push rod with the short arm of the lever, and lost motion means connecting the long arm of the lever with the slide to reciprocate the carrier toward and from the form.

8. In a pan making machine provided with a form and a guideway; a blank carrier movable in the guideway and provided inside its outer edge and two opposite adjoining edges with a ledge to support a blank; said carrier being open at the side toward the form; there being an orifice inside the ledge to allow the form to move through the carrier, and means to operate the carrier to bring a blank above the form.

9. In a pan making machine provided with a form and a guideway; a blank carrier movable in the guideway and provided inside its outer edge and two opposite adjoining edges with a ledge to support a blank; said carrier being open at the side toward the form; there being an orifice inside the ledge to allow the form to move through the carrier; means to operate the carrier to bring a blank above the form, and means to operate the form to lift the blank from the carrier.

10. In a machine for making wire rimmed pans; means for supplying wire; wire cutter means comprising a cutter tool and a cutter bar; said bar having a long arm, and being pivoted near the cutter tool; a mold; flaps to fold a blank to form the pan; and means operable by the operation of the blank folding means, to move the long arm of the cutter bar to cut the wire.

11. In a machine for making pans with wired rims; means for folding a blank to form a pan; a rim wire way; means to bend rim wires; wire placing and holding arms to move the bent wire along the rim wire way and hold it in place against the folded blank; and means for releasing the bent wires so they will fall from the wire benders in front of the placing and holding arms.

12. In a pan making machine, side and corner folding flaps; a form means for causing said flaps to move downward together to fold a side of the pan onto the form; levers mounted on horizontal axes; cams connected to operate said levers; and means for temporarily connecting the corner flaps to the levers, so as to change the direction of movement of the corner flaps from downward to near horizontal.

13. In a pan making machine, side folding flaps; corner folding flaps; means for locking said flaps together; means for swinging the flaps downward while locked together; means for unlocking said flaps at the close of their downward movement; means to move the unlocked corner folding flaps to fold a corner fold; and means for returning the locking means to locking position after the corner folds have been folded.

14. A rim wiring pan forming machine, having a form, and a sideway on which rim wires for a pan may be moved to the rim of a formed pan, and means to eject the completed pan along such slideway after the pan has been formed.

15. In a machine for making pans having wired rims, blank folding means; a cam; a horizontal sliding rod operable by the cam; wire placing and holding arms comprising levers pivoted to said rod; one of said arms being fulcrumed below and the other above the level of said rod so that the one cam will simultaneously operate the upper ends of the arms toward the blank folding means and likewise from the blank forming means.

16. In a machine for making pans having wired rims, a way along which wire may be moved toward the unfinished pan; a wire placing and holding arm to move a wire along such way; and means to eject a pan over such way; an outer portion of said way being lowered to accommodate the wire placing and holding arm so that the finished pan will pass over said arm under the impetus given the pan by the ejecting means.

17. In a machine for making pans having wired rims; a wire bending form having on its under face a groove; means for feeding to said groove, wire, the ends of which project beyond said groove; means for bending the projecting wire against the ends of the form, and means to allow the bent wire to drop from said groove when bent.

18. In a machine of the character set forth a wire bender form having in its under side a groove to accommodate a wire; means to hold the wire in such groove; and means to operate such wire holding means to release the wire.

19. In a machine of the character set forth a wire bender form having in its under side a groove to accommodate a wire; means to hold the wire in such groove; means to operate such wire holding means to release the wire; and means to eject the wire when released.

20. In a pan making machine of the character set forth, a wire guideway; means to hold a pan with extended rim projecting at the level of the guideway; a jaw to move wire along the guideway and onto such extended rim; means to hold the jaw and wire toward the guideway; and means to bend the pan rim onto the wire.

21. In a pan making machine of the character set forth, a wire guideway; means to hold a pan with extended rim projecting at the level of the guideway; a jaw to move wire along the guideway and onto such extended rim; means to hold the jaw and wire toward the guideway; means to bend the pan rim onto the wire; and means to bend the pan rim toward the guideway to grip the wire between the pan rim and pan walls.

In testimony whereof, I have hereunto set my hand at Los Angeles, California, this 28th day of June, 1922.

WILLIAM JOHN ROEPKE.